(12) United States Patent
White (10) Patent No.: US 7,102,774 B2
(45) Date of Patent: Sep. 5, 2006

(54) PRINT PROCESSING SYSTEM AND METHOD

(75) Inventor: Craig R. White, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1006 days.

(21) Appl. No.: 09/727,094

(22) Filed: Nov. 30, 2000

(65) Prior Publication Data

US 2002/0063887 A1    May 30, 2002

(51) Int. Cl.
*G06F 15/00* (2006.01)
(52) U.S. Cl. ..................................... 358/1.15; 358/1.14
(58) Field of Classification Search .................. 358/1.1, 358/1.5, 1.11, 1.12, 1.13, 1.14, 1.15, 1.18, 358/1.2, 407; 400/61, 62, 719
See application file for complete search history.

(56) References Cited

U.S. PATENT DOCUMENTS

| | | | | |
|---|---|---|---|---|
| 5,467,434 A | | 11/1995 | Hower, Jr. et al. | 395/114 |
| 5,630,062 A | * | 5/1997 | Okutsu | 718/100 |
| 5,897,260 A | * | 4/1999 | Zingher | 400/719 |
| 5,970,475 A | | 10/1999 | Barnes et al. | 705/27 |
| 6,552,813 B1 | * | 4/2003 | Yacoub | 358/1.1 |
| 6,631,008 B1 | * | 10/2003 | Aoki | 358/1.15 |
| 6,809,831 B1 | * | 10/2004 | Minari | 358/1.15 |
| 6,891,634 B1 | * | 5/2005 | Nihei | 358/1.15 |

FOREIGN PATENT DOCUMENTS

| | | |
|---|---|---|
| EP | 0905563 A2 | 3/1999 |
| JP | 10147043 | 6/1998 |
| JP | 11191151 | 7/1999 |
| WO | WO 00/03342 | 1/2000 |

OTHER PUBLICATIONS

European Search Report for EP Patent Application No. 01113033 filed May 28, 2001. Report issued Sep. 9, 2005 (The Hague).

* cited by examiner

*Primary Examiner*—Mark Wallerson (57) ABSTRACT

A system and method of processing a print job of a user includes providing a print processing system registry having at least one of a storage capability of a print job storage provider, a processing capability of a print job processing provider, and a printing capability of a print job print provider registered therewith. A communication network links a print job service provider and at least one of the print job storage provider, the print job processing provider, and the print job print provider. The print job service provider receives the print job and distributes the print job to the at least one of the print job storage provider, the print job processing provider, and the print job print provider via the communication network.

24 Claims, 8 Drawing Sheets

PRINT PROCESSING SYSTEM AND METHOD

THE FIELD OF THE INVENTION

The present invention relates generally to print services and, more particularly, to a network system and method of processing a print job of a user, including distributing the print job to one or more print processing providers each providing a print job processing service.

BACKGROUND OF THE INVENTION

Typically, a party having a print job with print processing needs must either fulfill the print processing needs on their own or contract with a print processing provider offering print processing services which can fulfill the print processing needs. Before contracting with a print processing provider, however, the party must identify which print processing providers offer specific print processing services such as storage, conversion, translation, enhancement, printing, delivery, etc., which can fulfill the print processing needs of their print job.

Unfortunately, identifying which print processing providers provide specific print processing services for a print job is often difficult. A party, for example, may find that the print processing providers do not provide the specific print processing services required or that the print processing providers do not provide the specific print processing services required within desired or necessary parameters. In addition, managing distribution of a print job among one or more print processing providers as required to fulfill the print processing needs of the print job is often a tedious task.

Accordingly, a need exists for processing a print job of a user and identifying which print processing providers can fulfill the print job. More particularly, a need exists for managing distribution of the print job among one or more print processing providers each providing a print job processing service.

SUMMARY OF THE INVENTION

One aspect of the present invention provides a system for processing a print job of a user. The system includes a print processing system registry and a print job service provider. The print processing system registry is configured to have at least one of a storage capability of a print job storage provider, a processing capability of a print job processing provider, and a printing capability of a print job print provider registered therewith, and the print job service provider is adapted to receive the print job from the user and distribute the print job to at least one of the print job storage provider, the print job processing provider, and the print job print provider.

Another aspect of the present invention provides a system for processing a print job of a user. The system includes a print processing system registry configured to have at least one of a printing capability of a print job print provider, a processing capability of a print job processing provider, and a storage capability of a print job storage provider registered therewith, and a print job service provider adapted to receive the print job from the user and submit the print job to the print processing system registry. As such, the print processing system registry is adapted to determine if the at least one of the printing capability, the processing capability, and the storage capability is necessary for the print job. Thus, the print job service provider is adapted to distribute the print job to at least one of the print job print provider if the printing capability is necessary for the print job, the print job processing provider if the processing capability is necessary for the print job, and the print job storage provider if the storage capability is necessary for the print job.

Another aspect of the present invention provides a system for processing a print job of a user. The system includes a print processing system registry configured to have a printing capability of a print job print provider and at least one of a storage capability of a print job storage provider and a processing capability of a print job processing provider registered therewith, and a print job service provider adapted to receive the print job from the user and submit the print job to the print processing system registry. As such, the print processing system registry is adapted to determine if the printing capability and the at least one of the storage capability and the processing capability are necessary for the print job. Thus, the print job service provider is adapted to distribute the print job to the print job print provider if the printing capability is necessary for the print job and at least one of the print job storage provider if the storage capability is necessary for the print job and the print job processing provider if the processing capability is necessary for the print job.

Another aspect of the present invention provides a method of processing a print job of a user. The method includes providing a print processing system registry having at least one of a storage capability of a print job storage provider, a processing capability of a print job processing provider, and a printing capability of a print job print provider registered therewith, defining a communication network linking a print job service provider and at least one of the print job storage provider, the print job processing provider, and the print job print provider, receiving the print job at the print job service provider, and distributing the print job to the at least one of the print job storage provider, the print job processing provider, and the print job print provider via the communication network.

Another aspect of the present invention provides a method of processing a print job of a user. The method includes providing a print processing system registry having print job processing services of a plurality of print processing system providers registered therewith, defining a communication network linking a print job service provider, the print processing system registry, and the print processing system providers, receiving the print job at the print job service provider, submitting the print job via the communication network to the print processing system registry, determining via the print processing system registry which of the print job processing services are necessary for the print job, and distributing the print job via the communication network to at least one of the print processing system providers which has the print job processing services necessary for the print job. The step of determining which of the print job processing services are necessary for the print job includes comparing the print job with the print job processing services of the print processing system providers.

In one embodiment, the present invention provides a system and method of processing a print job of a user, including distributing the print job to at least one of a plurality of print processing system providers each providing a print job processing service. The system and method utilizes a communication network to link the user, a print job service provider, and at least one of the print processing system providers.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
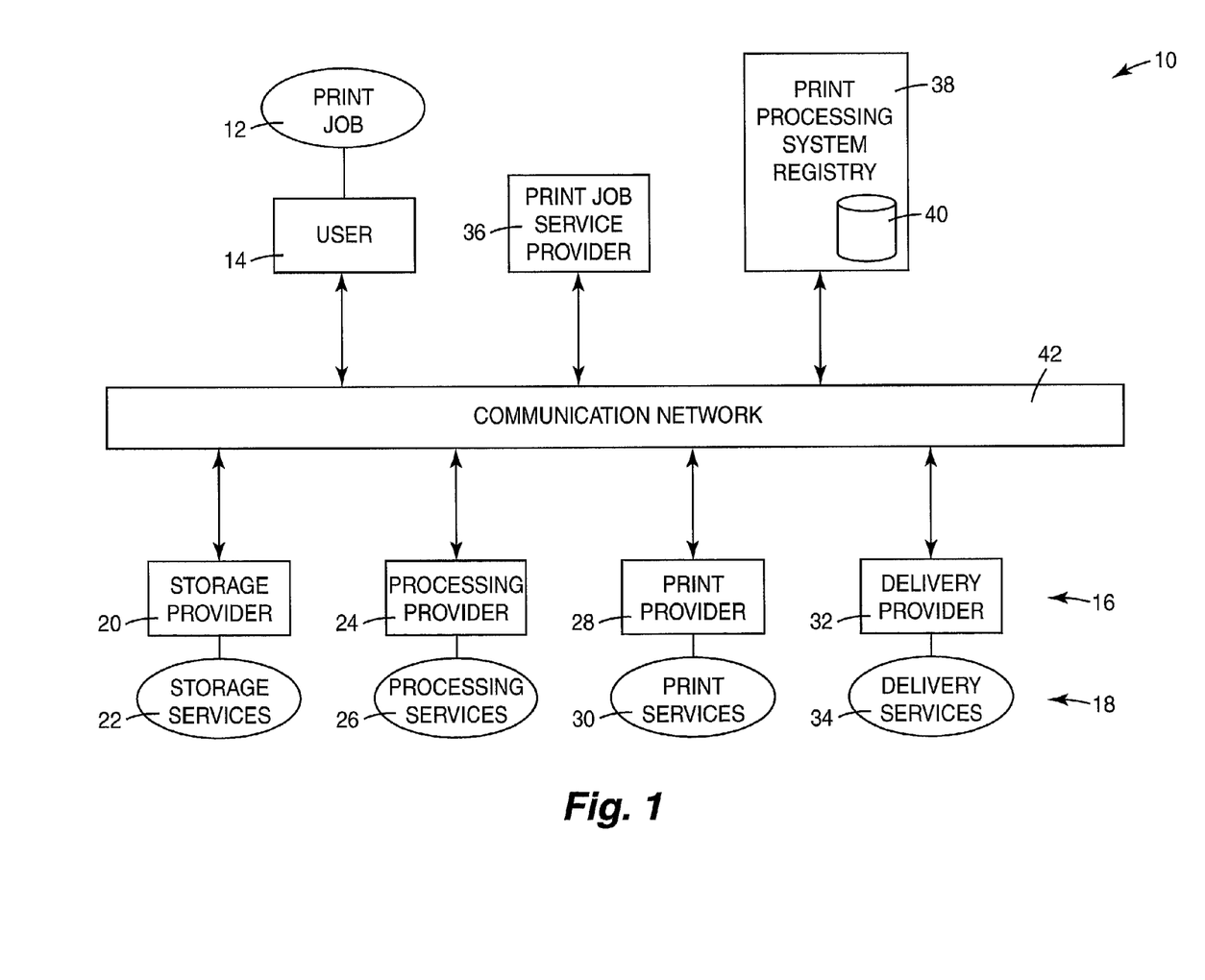
FIG. 1 is a block diagram illustrating one exemplary embodiment of a print processing system according to the present invention.

A network print processing system according to the present invention is illustrated generally at 10 in FIG. 1. Print processing system 10 facilitates processing of a print job 12 of a user 14. In particular, print processing system 10 automatically distributes print job 12 to at least one of a plurality of print processing system providers 16 each providing a respective print job processing service 18.

In one exemplary embodiment, print processing system providers 16 include a storage provider 20 providing storage services 22 for print job 12, a processing provider 24 providing processing services 26 for print job 12, a print provider 28 providing print services 30 for print job 12, and a delivery provider 32 providing delivery services 34 for print job 12. One exemplary embodiment of storage services 22, processing services 26, print services 30, and delivery services 34 are each described in detail later in this specification. Print job 12, as used herein, is defined to include a piece of work requiring production and/or reproduction of printed matter. User 14, as used herein, is defined to include an entity or entities such as a consumer, an employee, or a print processing system provider 16 requesting, soliciting, and/or using storage services, processing services, printing services, finishing services, delivery services, and/or other print job processing services.

In one exemplary embodiment, print processing system 10 includes a print job service provider 36 and a print processing system registry 38. Print job service provider 36 fronts, coordinates, and/or manages utilization of print job processing services 18 of print processing system providers 16 and print processing system registry 38 constitutes a repository of print job processing services 18 of print processing system providers 16, as described below.

In one exemplary embodiment, print processing system registry 38 includes a print processing data storage system 40. Print processing data storage system 40 constitutes a database of one or more data files for print processing system 10. Examples of print processing data storage system 40 include nonvolatile memory (e.g., a hard disk drive or other persistent storage device) and may include volatile memory (e.g., random access memory (RAM)). Another example of print processing data storage system 40 may include a relational data base management server (RDBMS). Data is transferred to and from print processing data storage system 40 via print processing system registry 38.

In one exemplary embodiment, user 14, print processing system providers 16, print job service provider 36, and print processing system registry 38 are all located remote from each other (i.e., at different locations). As such, user 14, print processing system providers 16, print job service provider 36, and print processing system registry 38 communicate with each other via a communication network 42. More specifically, communications between user 14 and print job service provider 36, communications between print job service provider 36 and print processing system registry 38, communications between print job service provider 36 and print processing system providers 16, and communications between print processing system providers 16 and print processing system registry 38 are conducted over communication network 42.

Communication network 42, as used herein, is defined to include an internet communication network, an intranet communication network, or similar high-speed communication network. In one preferred embodiment, communication network 42 includes an Internet communication network.

Preferably, print job service provider 36 communicates with print processing system registry 38 via communication network 42. It is, however, within the scope of the present invention for print job service provider 36 and print processing system registry 38 to be located at the same location. Thus, print job service provider 36 may communicate with print processing system registry 38 in other manners (e.g., a direct connection or communication link). In addition, print job service provider 36 and print processing system registry 38 may constitute a central print job service system.

Components of print processing system 10, including print processing system providers 16, print job service provider 36, and/or print processing system registry 38, can be implemented in hardware via a microprocessor, programmable logic device, or state machine, in firmware, or in software within a given device. In one embodiment, at least a portion of the software programming is written in JAVA programming language, and each of the main components communicate via communication network 42 using a communication bus protocol. For example, the present invention may or may not use a TCP/IP protocol suite for data transport. Other programming languages and communication bus protocols suitable for use with print processing system 10 will become apparent to those skilled in the art after reading the present application.

Print processing system providers 16, print job service provider 36, and/or print processing system registry 38 include hardware, software, firmware, or a combination of these. In one preferred embodiment, print processing system providers 16, print job service provider 36, and/or print processing system registry 38 include a computer server or other microprocessor based system capable of performing a sequence of logic operations. In addition, print processing system providers 16, print job service provider 36, and/or print processing system registry 38 can include a microprocessor embedded system/appliance incorporating tailored appliance hardware and/or dedicated single purpose hardware.

Figure 2:
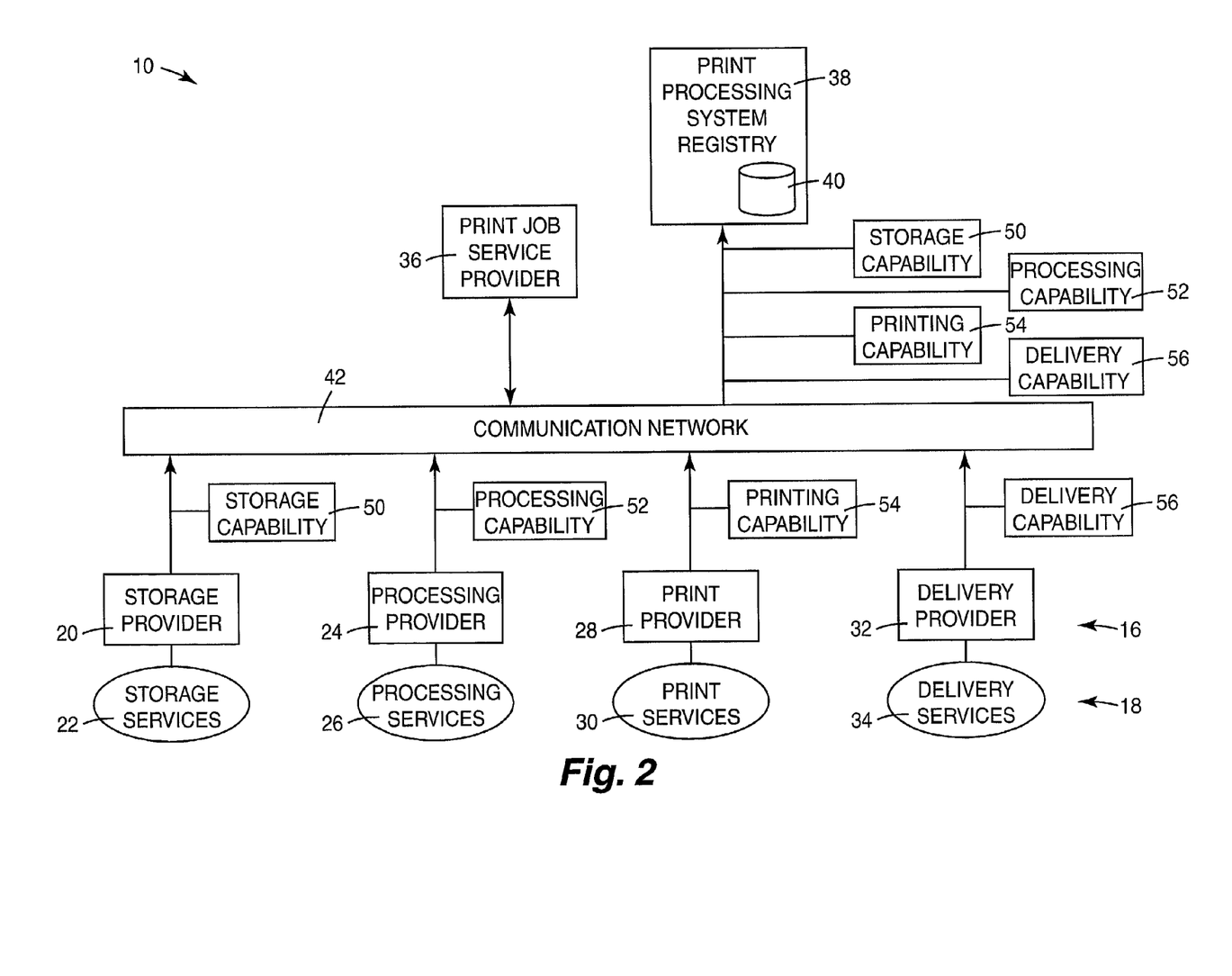
FIG. 2 is a block diagram illustrating one exemplary embodiment of information flow through the print processing system of FIG. 1.

As illustrated in FIG. 2, print processing system providers 16 register a respective print job processing service 18 with print processing system registry 38 via communication network 42. More specifically, storage provider 20 registers a storage capability 50 with print processing system registry 38, processing provider 24 registers a processing capability 52 with print processing system registry 38, print provider 28 registers a printing capability 54 with print processing system registry 38, and delivery provider 32 registers a delivery capability 56 with print processing system registry 38. Storage capability 50, processing capability 52, printing capability 54, and delivery capability 56 identify attributes of storage services 22 provided by storage provider 20, processing services 26 provided by processing provider 24, print services 30 provided by print provider 28, and delivery services 34 provided by delivery provider 32, respectively, as described below.

It is understood that storage provider 20, processing provider 24, print provider 28, and/or delivery provider 32 can re-register and/or update storage capability 50, processing capability 52, printing capability 54, and/or delivery capability 56, respectively, with print processing system registry 38. If, for example, print provider 28 modifies print services 30 by adding, deleting, and/or upgrading equipment, components, and/or services, print provider 28 can reregister printing capability 54 with print processing system registry 38. In addition, if print provider 28 has excess capacity or, more specifically, the ability to take on additional work, print provider 28 can update printing capability 54 in print processing system registry 38.

Figure 3:
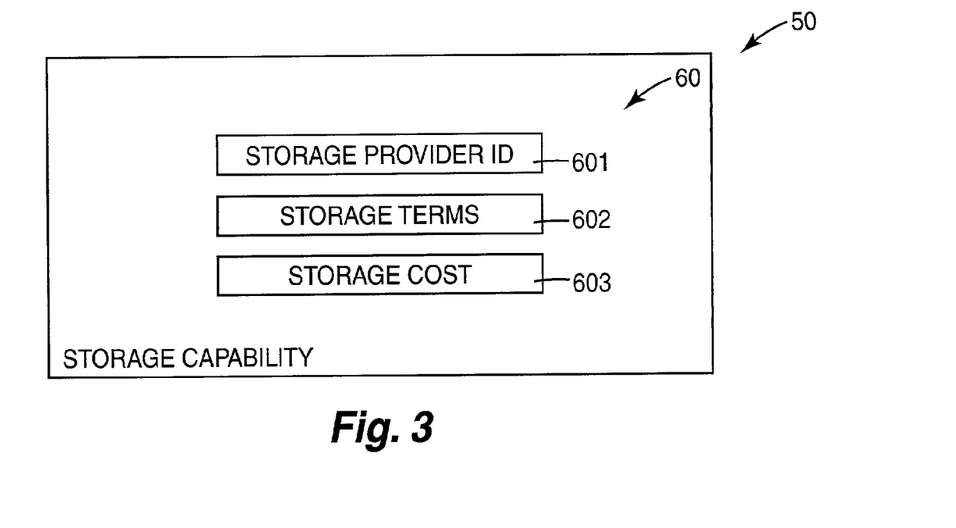
FIG. 3 is a diagram illustrating one exemplary embodiment of a storage capability of a storage provider registered with the print processing system of FIG. 1.

In one exemplary embodiment, as illustrated in FIG. 3, storage capability 50 includes a plurality of storage capability attributes 60 which define storage services 22 offered by storage provider 20. Storage capability attributes 60 include, for example, a storage provider identification attribute 601, a storage term attribute 602, and a storage cost attribute 603.

Storage provider identification attribute 601 identifies, for example, a name and an address of storage provider 20. Storage term attribute 602 identifies different storage terms that storage provider 20 offers for print job 12. Examples of different storage terms include short term storage and/or long term or archival storage. Storage cost attribute 603 identifies a cost of storage services 22 offered by storage provider 20.

Figure 4:
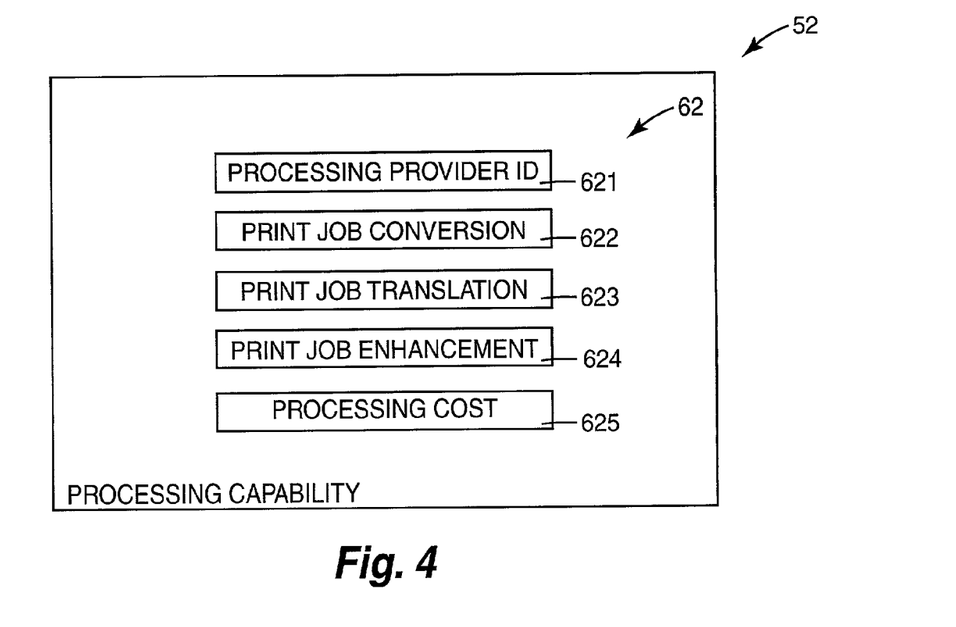
FIG. 4 is a diagram illustrating one exemplary embodiment of a processing capability of a processing provider registered with the print processing system of FIG. 1.

In one exemplary embodiment, as illustrated in FIG. 4, processing capability 52 includes a plurality of processing capability attributes 62 which define processing services 26 offered by processing provider 24. Processing capability attributes 62 include, for example, a processing provider identification attribute 621, a print job conversion attribute 622, a print job translation attribute 623, a print job enhancement attribute 624, and a processing cost attribute 625.

Processing provider identification attribute 621 identifies, for example, a name and an address of processing provider 24. Print job conversion attribute 622 identifies different format conversions that processing provider 24 offers for print job 12. An example of a format conversion includes conversion of print job 12 from Microsoft Word® (.DOC) format to Portable Document Format (.PDF).

Print job translation attribute 623 identifies different document translations that processing provider 24 offers for print job 12. An example of a document translation includes translation from Japanese to English.

Print job enhancement attribute 624 identifies different document enhancements that processing provider 24 offers for print job 12. Examples of different document enhancements include red-eye reduction for photographs and image enhancement for graphical and/or textual images.

Processing cost attribute 625 identifies a cost of processing services 26 offered by processing provider 24. It is understood that additional format conversions, document translations, and document enhancements may be identified with print job conversion attribute 622, print job translation attribute 623, and print job enhancement attribute 624, respectively.

Figure 5:
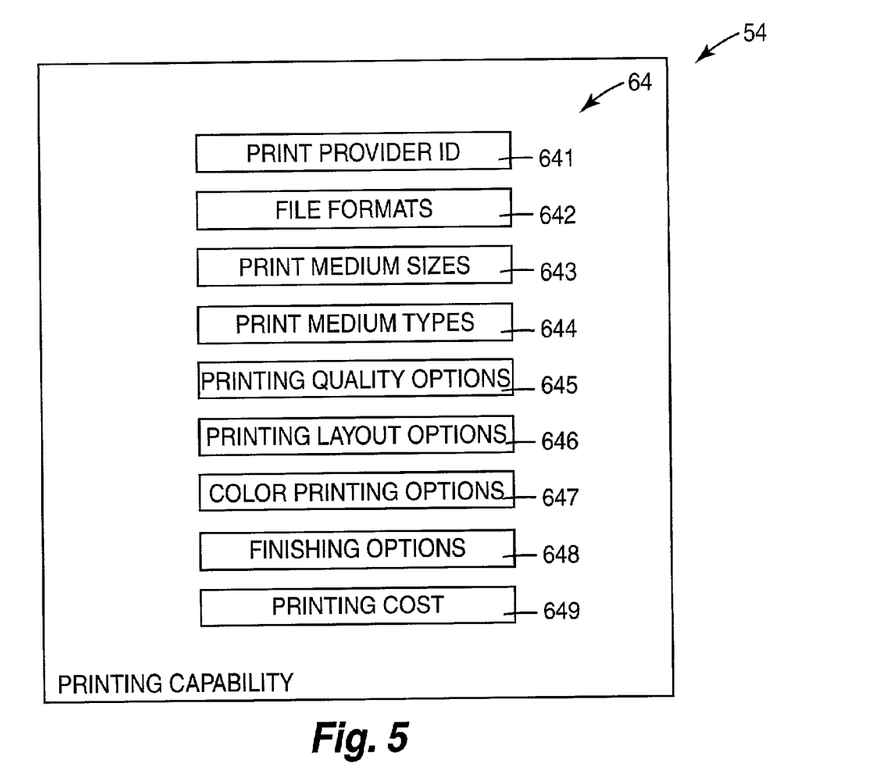
FIG. 5 is a diagram illustrating one exemplary embodiment of a printing capability of a print provider registered with the print processing system of FIG. 1.

In one exemplary embodiment, as illustrated in FIG. 5, printing capability 54 includes a plurality of printing capability attributes 64 which define print services 30 offered by print provider 28. Printing capability attributes 64 include, for example, a print provider identification attribute 641, a file formats attribute 642, a print medium sizes attribute 643, a print medium types attribute 644, a printing quality options attribute 645, a printing layout options attribute 646, a color printing options attribute 647, a finishing options attribute 648, and a printing cost attribute 649.

Print provider identification attribute 641 identifies, for example, a name and an address of print provider 28. File formats attributes 642 identifies different file formats that print provider 28 supports and, more specifically, file formats from which print provider 28 is capable of printing. Examples of different file formats include a Microsoft Word® (.DOC) format, a Portable Document Format (.PDF), and a PostScript (.PS) format.

Print medium sizes attribute 643 identifies different sizes of print medium upon which print provider 28 is capable of printing. Examples of different print medium sizes include a Letter size, a Legal size, and an A4 size of print medium. Print medium types attribute 644 identifies different types of print medium upon which print provider 28 is capable of printing. Examples of different print medium types include a Plain, a Gloss, and a Bond type of print medium.

Printing quality options attribute 645 identifies different printing qualities that print provider 28 is capable of offering as print services 30. An example of printing quality includes different printing resolutions such as 1200 dpi, 600 dpi, 300 dpi. Print layout options attribute 646 identifies different printing layouts that print provider 28 is capable of providing as print services 30. Examples of different printing layout options include Portrait and Landscape and Single-Sided and Double-Sided.

Color printing options attribute 647 identifies different color printing options that print provider 28 is capable of offering as print services 30. Examples of different color printing options include Color Printing, Grayscale Printing, and Monochrome Printing. Finishing options attribute 648 identifies different finishing options that print provider 28 is capable of providing as print services 30. Examples of different print finishing options include Three-Hole Punched, Stapled, and Spiral Bound.

Printing cost attribute 649 identifies a cost of print services 30 offered by print provider 28. It is understood that print provider 28 may offer multiple options for each attribute and that certain options may be specific to specific attributes. For example, print provider 28 may offer a specific print medium size or range of sizes per a specific print medium type. In addition, additional file formats, print medium sizes, print medium types, printing quality options, printing layout options, color printing options, and finishing options, as are well known in the art, may be identified with file formats attribute 642, print medium sizes attribute 643, print medium types attribute 644, printing quality options attribute 645, printing layout options attribute 646, color printing options attribute 647, and finishing options attribute 648, respectively.

Figure 6:
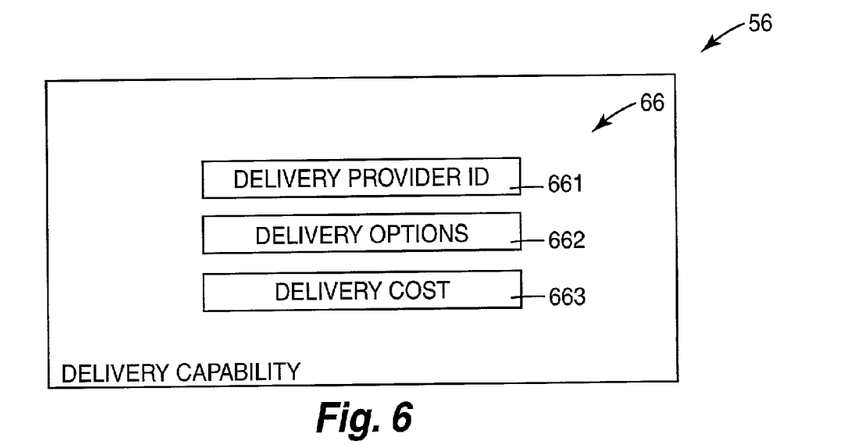
FIG. 6 is a diagram illustrating one exemplary embodiment of a delivery capability of a delivery provider registered with the print processing system of FIG. 1.

In one exemplary embodiment, as illustrated in FIG. 6, delivery capability 56 includes a plurality of delivery capability attributes 66 which define delivery services 34 offered by delivery provider 32. Delivery capability attributes 66 include, for example, a delivery provider identification attribute 661, a delivery options attribute 662, and a delivery cost attribute 663.

Delivery provider identification attribute 661 identifies, for example, a name and an address of delivery provider 32. Delivery options attribute 662 identifies different delivery options that delivery provider 32 offers for print job 12. Examples of different delivery options include Overnight Delivery, Two-Day Delivery, Air Delivery, and Ground Delivery. Delivery cost attribute 663 identifies a cost delivery services 34 offered by delivery provider 32.

Figure 7:
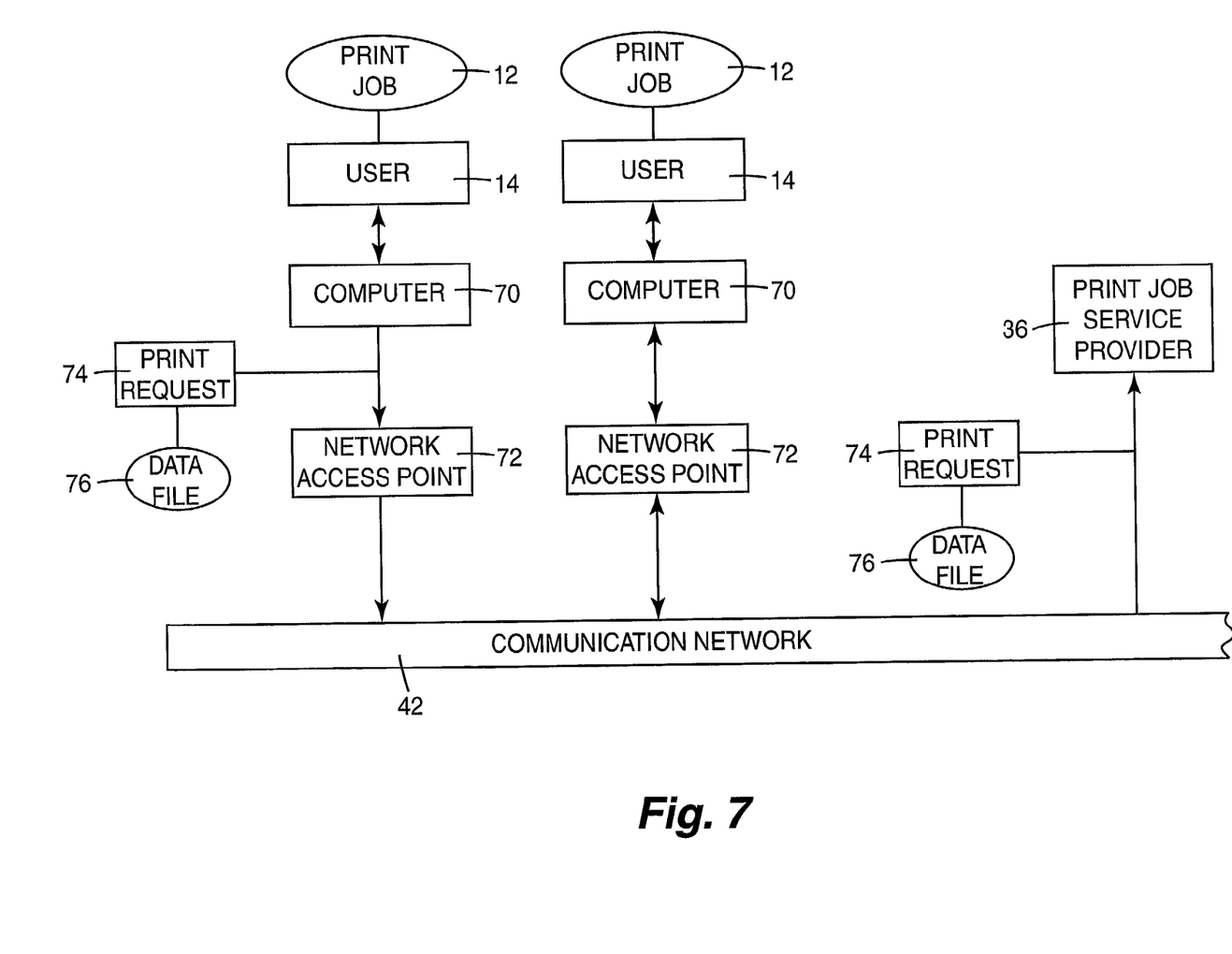
FIG. 7 is a block diagram illustrating one exemplary embodiment of information flow through a portion of the print processing system of FIG. 1.

As illustrated in FIG. 7, user 14 accesses communication network 42 and, therefore, print processing system 10 via a computer 70 and a network access point 72. Computer 70 may include, for example, an input device such as a keyboard and/or a mouse and a display device such as a monitor, as is well known in the art. Computer 70 may be an appliance such as a personal digital assistant (PDA), scanner, camera, cellular phone, etc.

In one exemplary embodiment, computer 70 runs an operating system which can support one or more applications. The operating system is stored in memory and executes on a processor. The operating system is preferably a multi-tasking operating system which allows simultaneous execution of multiple applications, although aspects of this invention may be implemented using a single-tasking operating system.

Network access point 72 provides an access point to communication network 42. Communication network 42, therefore, may be accessed from computer 70 via a modem or high-speed communication link, including a wireless or infrared communication link, and network access point 72. In one exemplary embodiment, network access point 72 constitutes a Point-Of-Presence (POP) on communication network 42.

It is within the scope of the present invention for multiple users 14 to utilize print processing system 10. Thus, one or more users 14, located in the same and/or different geographical locations and each having a respective print job 12, may access communication network 42 from a respective computer 70. As such, one or more users 14 may use different network access points 72 and/or one or more users 14 may use the same network access point 72.

In one exemplary embodiment, user 14 interacts with computer 70 to generate a print request 74 for print job 12 and submit print request 74 for print job 12 to print job service provider 36 via communication network 42. As such, print job service provider 36 receives print request 74 from user 14, processes print request 74, including submitting print request 74 to print processing system registry 38, and distributes print request 74 to print processing system providers 16, as described below. Print request 74 identifies attributes of print job 12 as specified by user 14. Print request 74, as used herein, is defined to include a list and/or a description of a piece of work requiring production and/or reproduction of printed matter.

In one exemplary embodiment, a data file 76 for print job 12 is associated with print request 74. As such, data file 76 is submitted with print request 74 and uploaded to print job service provider 36 via communication network 42.

Figure 8:
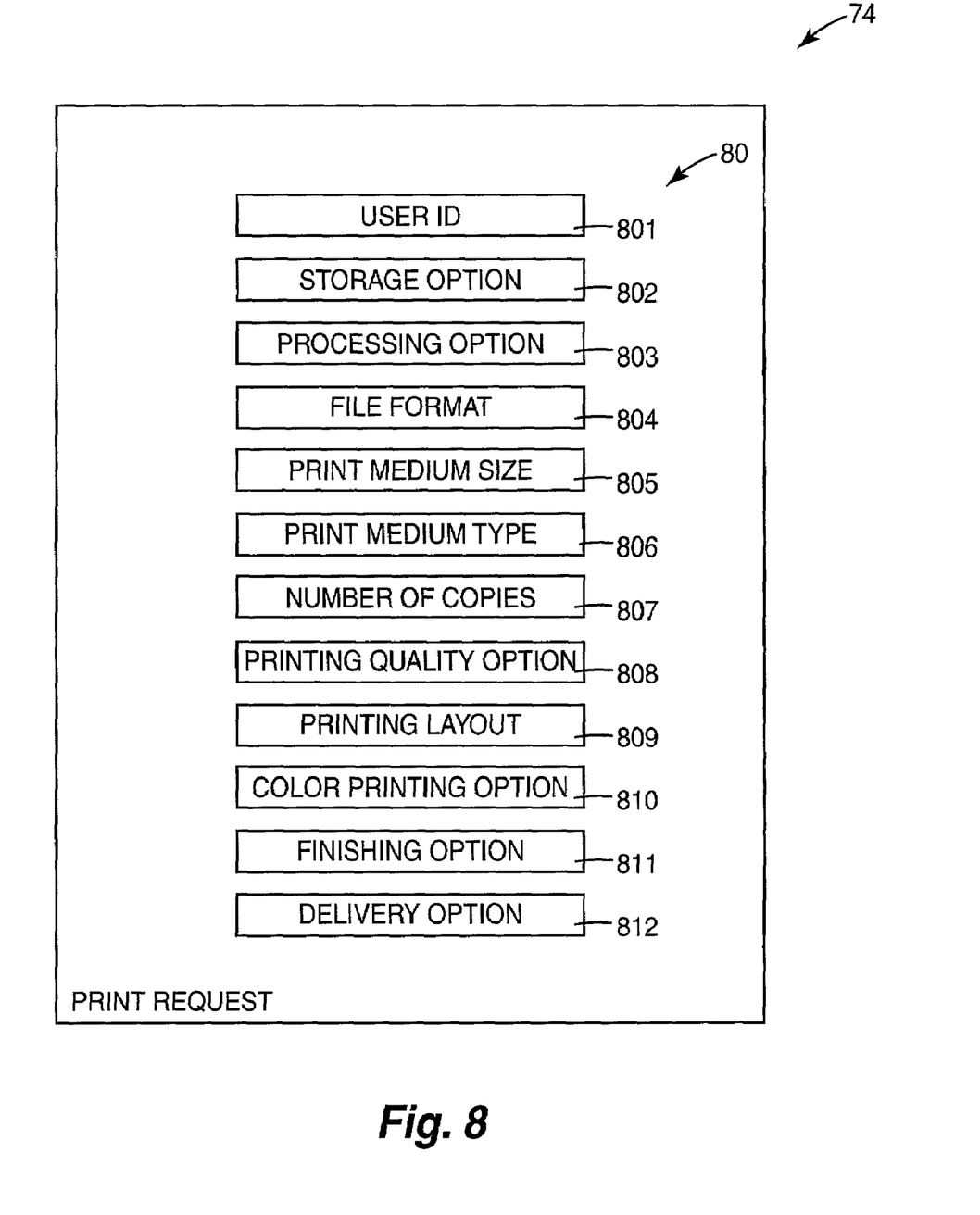
FIG. 8 is a diagram illustrating one exemplary embodiment of a print request for a print job processed by the print processing system of FIG. 1.

As illustrated in FIG. 8, print request 74 includes a plurality of print request attributes 80 which define print job 12. Print request attributes 80 are specified and/or selected by user 14 while interacting with computer 70. As such, print request attributes 80 are conveyed to print job service provider 36 from computer 70. Print request attributes 80 include, for example, a user identification attribute 801, a storage option attribute 802, a processing option attribute 803, a file format attribute 804, a print medium size attribute 805, a print medium type attribute 806, a number of copies attribute 807, a printing quality option attribute 808, a printing layout attribute 809, a color printing option attribute 810, a finishing option attribute 811, and a delivery option attribute 812.

User identification attribute 801 includes, for example, a name and an address of user 14. Storage option attribute 802 includes a selected or desired storage for print job 12. Processing option attribute 803 includes a selected or desired processing to be applied to print job 12. File format attribute 804 includes a format of the file from which print job 12 is to be printed. Print medium size attribute 805 includes a selected or desired size of medium upon which print job 12 is to be printed. Print medium type attribute 806 includes a selected or desired type of medium upon which print job 12 is to be printed. Number of copies attribute 807 includes the number of copies included in print job 12. Printing quality option attribute 808 includes a selected or desired printing quality for print job 12. Printing layout attribute 809 includes a selected or desired layout of how print job 12 is to be printed. Color printing option attribute 810 includes a selected or desired color content for print job 12. Finishing option attribute 811 includes a selected or desired finish to be applied to print job 12. Delivery option attribute 812 includes how and within what time frame print job 12 is to be delivered to user 14. It is understood that not all attributes need be specified and that additional attributes may be included in print request 74.

In one exemplary embodiment, print job service provider 36 and/or print processing system registry 38 infer or determine a number of print request attributes 80 from data file 76 for print job 12, as submitted with print request 74 for print job 12. Print job service provider 36 and/or print processing system registry 38 determine, for example, file format attribute 804, print medium size attribute 805, and/or printing layout attribute 809 of print job 12 from data file 76. User 14, therefore, need only enter those print request attributes 80 which are not determined by print job service provider 36 and/or print processing system registry 38. As such, it is not necessary for a user 14 to enter all print request attributes 80.

Figure 9:
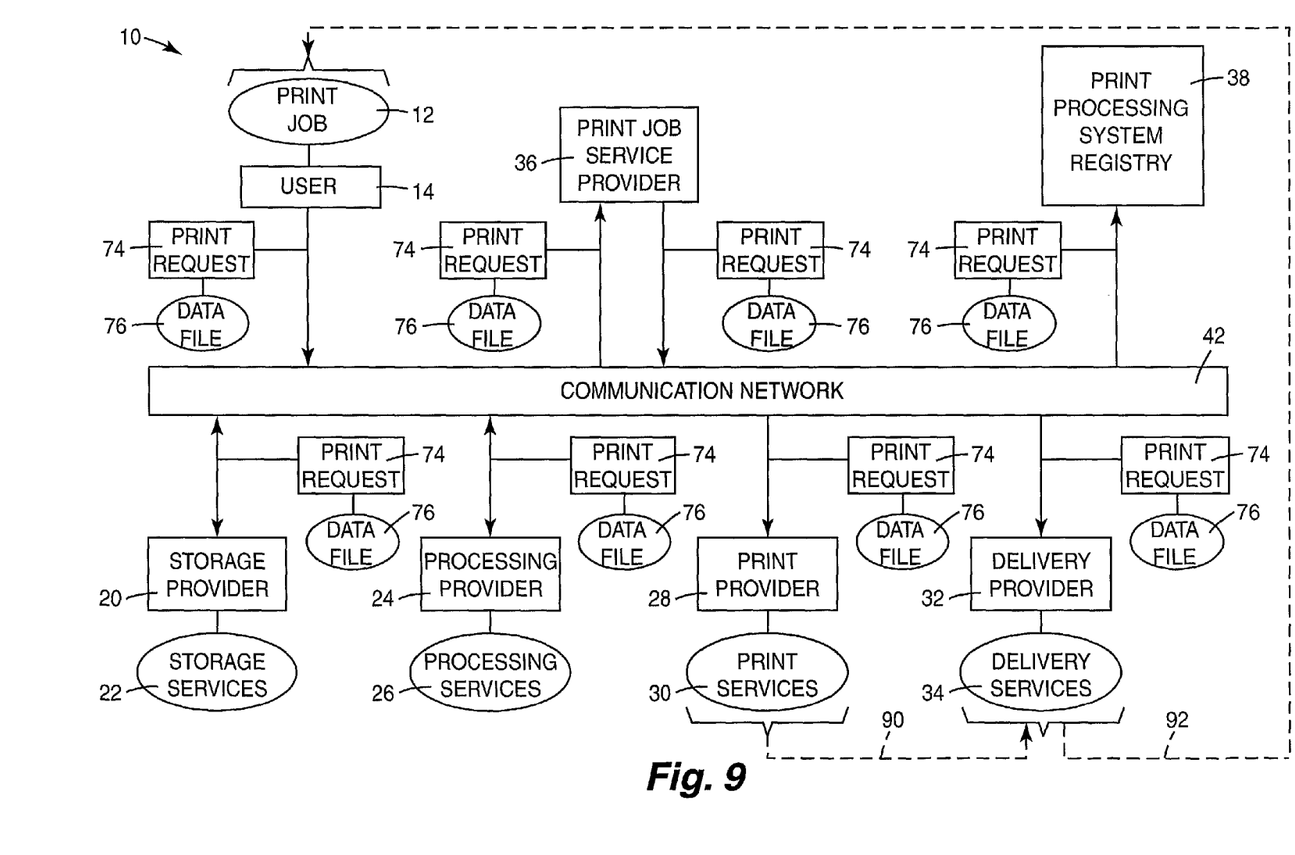
FIG. 9 is a block diagram illustrating one exemplary embodiment of information flow through the print processing system of FIG. 1.

As illustrated in FIG. 9, print job service provider 36 receives print job 12 and, more specifically, print request 74 for print job 12 and data file 76 for print job 12 from user 14.

In one exemplary embodiment, print job service provider receives print request 74 and data file 76 from user 14 via communication network 42. As such, print job service provider 36 manages and/or coordinates distribution of print job 12 and, more specifically, print request 74 for print job 12 and data file 76 for print job 12 to one or more print processing system providers 16. Print job service provider 36 distributes print request 74 and data file 76 to print processing system providers 16 based on print job 12 and print job processing services 18 of print processing system providers 16.

To determine which print job processing services 18 fulfill print job 12 and, therefore, to which print processing system providers 16 to distribute print request 74 and data file 76 for print job 12, print job service provider 36 distributes print request 74 and data file 76 to print processing system registry 38. In one exemplary embodiment, print job service provider 36 distributes print request 74 and data file 76 for print job 12 to print processing system registry 38 via communication network 42. As such, print processing system registry 38 compares print request 74 and/or data file 76 with storage capability 50 of storage provider 22, processing capability 52 of processing provider 24, printing capability 54 of print provider 28, and delivery capability 56 of delivery provider 32. More specifically, print processing system registry 38 compares print request attributes 80 of print request 74 and/or data file 76 with storage capability attributes 60 of storage services 22, processing capability attributes 62 of processing services 26, printing capability attributes 64 of print services 30, and delivery capability attributes 66 of delivery services 34.

Print processing system registry 38 determines whether storage capability 50, processing capability 52, printing capability 54, and/or delivery capability 56 of storage provider 22, processing provider 24, print provider 28, and/or delivery provider 32, respectively, fulfills a respective aspect of print job 12, namely storage, processing, printing, and/or delivery of print job 12. Thus, print processing system registry 38 identifies which print job processing services 18 and, therefore, which print processing system providers 16 are necessary for print job 12. Accordingly, print job service provider 36 distributes print request 74 for print job 12 and data file 76 for print job 12 to those print processing system providers 16 necessary for print job 12.

If, for example, print request 74 for print job 12 indicates storage of print job 12, as specified by storage option attribute 802 of print request 74, then, print job service provider 36 distributes print request 74 and data file 76 for print job 12 to storage provider 20. As such, storage provider 20 stores print request 74 and data file 76 for print job 12 based on print request 74. Thus, print job service provider 36 retrieves print request 74 and data file 76 for print job 12 from storage provider 20 when necessary. Storage of print request 74 and data file 76 may be required, for example, before and/or after print job 12 is printed.

If, for example, print request 74 for print job 12 indicates processing of print job 12, as specified by processing option attribute 803 of print request 74, then, print job service provider 36 distributes print request 74 and data file 76 for print job 12 to processing provider 24. As such, processing provider 24 processes print job 12 and, more specifically, data file 76 for print job 12 based on print request 74. Processing of print job 12 may be required, for example, to convert data file 76 from one format to another format for printing. After processing print job 12, processing provider 24 submits processed print job 12 to print job service provider 36 for subsequent distribution. It is, however, within the scope of the present invention for processing provider 24 to submit print job 12 to another print processing system provider 16, such as print provider 28.

It is understood that print request 74 for print job 12 and data file 76 for print job 12 may be distributed to multiple print processing system providers 16. Thus, only those print request attributes 80 which are relevant to the respective print processing system provider 16 need be distributed to each print processing system provider 16.

To print print job 12, print job service provider 36 submits print request 74 and data file 76 for print job 12 to print provider 28. Print request 74 identifies attributes of print job 12 and data file 76 includes a content of print job 12. Thus, print provider 28 prints print job 12 based on print request 74 and data file 76.

If, for example, print request 74 for print job 12 indicates delivery of print job 12, as specified by delivery option attribute 812 of print request 74, then, print provider 28 distributes printed print job 12 to delivery provider 32. In addition, print job service provider 36 distributes print request 74 for print job 12 and data file 76 for print job 12 to delivery provider 32. Print request 74 specifies, for example, a delivery option for print job 12 and data file 76 includes delivery information for print job 12. Thus, delivery provider 32 delivers print job 12 to user 14 based on print request 74 and data file 76. Distribution of print job 12 from print provider 28 to delivery provider 32 is indicated by dashed line 90 and delivery of print job 12 from delivery provider 32 to user 14 is indicated by dashed line 92.

It is understood that storage provider 20, processing provider 24, print provider 28, and/or delivery provider 32 may include one or more storage providers, processing providers, print providers, and/or delivery providers, respectively. Thus, print processing system registry 38 may identify one or more storage providers, processing providers, print providers, and/or delivery providers which are capable of fulfilling print job 12. Print job service provider 36, therefore, may select one or more storage providers, processing providers, print providers, and/or delivery providers to complete print job 12. In addition, print job service provider 36 may present multiple offers to user 14 for completion of print job 12. User 14, therefore, may select one or more storage providers, processing providers, print providers, and/or delivery providers to complete print job 12. Print job service provider 36 and/or user 14 may select storage provider 20, processing provider 24, print provider 28, and/or delivery provider 32 based, for example, on a proximity, cost, and/or rating of storage services 22, processing services 26, print services 30, and/or delivery services 34, respectively. In addition, print job service provider 36 may solicit storage provider 20, processing provider 24, print provider 28, and/or delivery provider 32 for an updated capability, such as cost, to complete print job 12.

It is also understood that print job service provider 36 may include one or more print job service providers. As such, each print job service provider 36 may access the same print processing system registry 38. Thus, user 14 may select one or more print job service providers to complete print job 12. User 14 may select print job service provider 36 based, for example, on a proximity, cost, and/or rating of services provided by the print job service providers.

Figure 10:
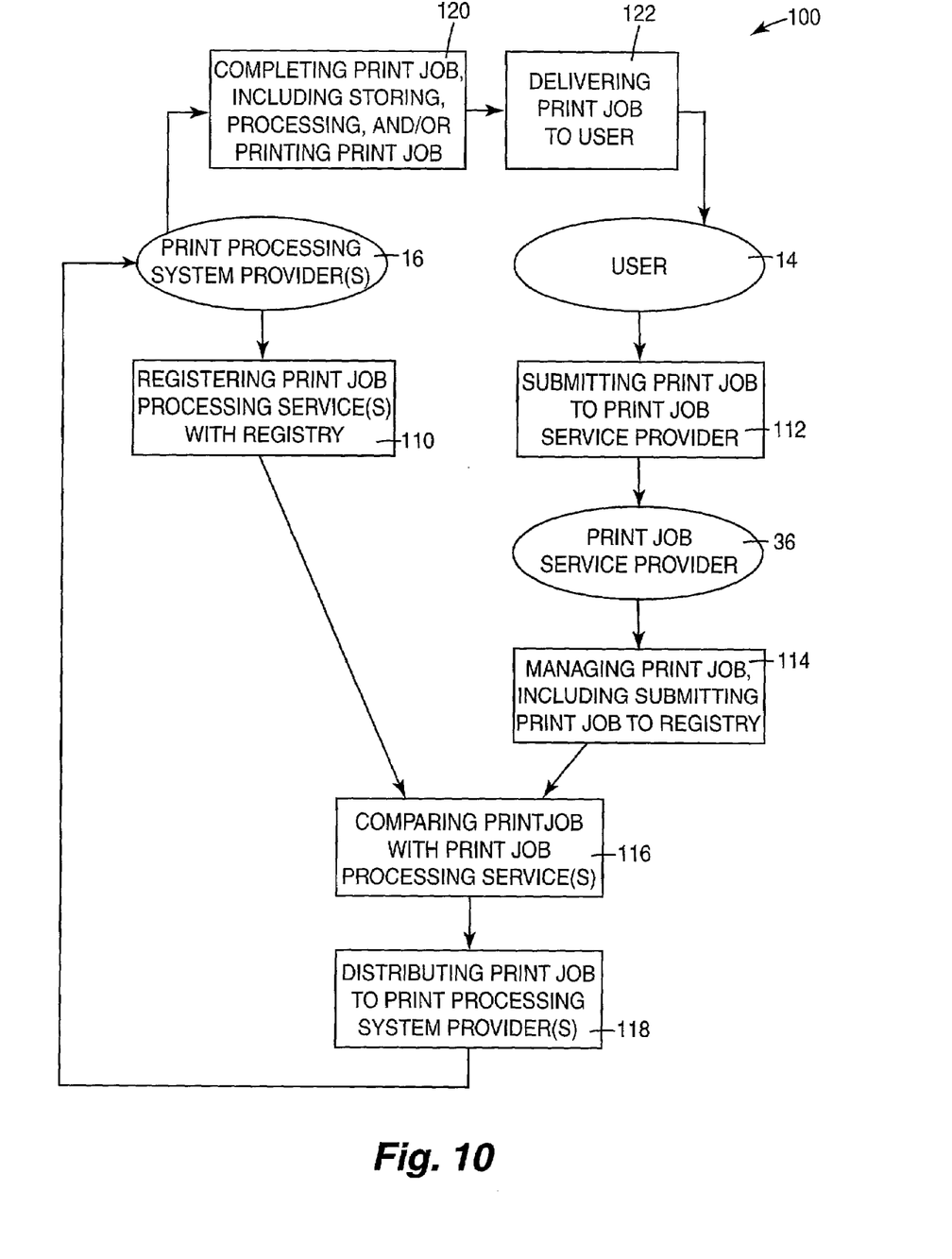
FIG. 10 is a flow diagram illustrating one exemplary embodiment of a method of processing a print job of a user according to the present invention.

In FIG. 10, a flow diagram illustrating one exemplary embodiment of a method of processing print job 12 according to the present invention is illustrated generally at 100. Reference is also made to FIGS. 1–9. At step 110, at least one print processing system provider 16 registers a respective print job processing service 18 with print processing system registry 38 and, at step 112, user 14 submits print job 12 to print job service provider 36. More specifically, at step 110, storage provider 20, processing provider 24, print provider 28, and/or delivery provider 32 register storage capability 50 of storage services 22, processing capability 52 of processing services 26, printing capability 54 of print services 30, and/or delivery capability 56 of delivery services 34 with print processing system registry 38. In addition, at step 112, user 14 submits print request 74 for print job 12 and data file 76 for print job 12 to print job service provider 36.

In one exemplary embodiment, print processing system providers 16 register a respective print job processing service 18 with print processing system registry 38 via communication network 42, as illustrated in FIG. 2, and user 14 submits print request 74 for print job 12 and data file 76 for print job 12 to print job services provider 36 via communication network 42, as illustrated in FIG. 7.

Next, in step 114, after print job service provider 36 receives print job 12, print job service provider 36 coordinates or manages completion of print job 12. As such, print job service provider 36 determines which print job processing services 18 are necessary to fulfill print job 12. Thus, print job service provider 36 automatically submits print job 12 to print processing system registry 38 to determine which print processing system providers 16 are necessary to fulfill print job 12. More specifically, print job service provider 36 submits print request 74 for print job 12 and data file 76 for print job 12 to print processing system registry 38 via communication network 42, as illustrated in FIG. 9.

Next, in step 116, print job 12 is compared with print job processing services 18, as registered with print processing system registry 38 in step 110. More specifically, print request 74 for print job 12 and data file 76 for print job 12 are compared with storage capability 50 of storage services 22, processing capability 52 of processing services 26, printing capability 54 of print services 30, and/or delivery capability 56 of delivery services 34. Print processing system registry 38, therefore, compares print request attributes 80 with storage capability attributes 60, processing capability attributes 62, printing capability attributes 64, and/or delivery capability attributes 66. Thus, print processing system registry 38 identifies which print processing system providers 16, such as storage provider 20, processing provider 24, print provider 28, and/or delivery provider 32 are necessary to fulfill print job 12.

In one exemplary embodiment, submitting print job 12 to print job service provider 36 in step 112 includes selecting print job service provider 36 from a plurality of print job service providers. User 14, for example, may select print job service provider 36, as described above. In addition, in step 116, print processing system registry 38 may identify one or more storage providers, processing providers, print providers, and/or delivery providers which are capable of fulfilling print job 12. User 14, therefore, may select storage provider 20, processing provider 24, print provider 28, and/or delivery provider 32, as described above.

Next, in step 118, print job service provider 36 distributes print job 12 to those print processing system providers 16 necessary for print job 12, as identified in step 116. More specifically, print job service provider 36 automatically distributes print job 12 to storage provider 20, processing provider 24, print provider 28, and/or delivery provider 32. In one exemplary embodiment, print job service provider 36 distributes print request 74 for print job 12 and data file 76 for print job 12 to storage provider 20, processing provider 24, print provider 28, and/or delivery provider 32 via communication network 42, as illustrated in FIG. 9.

Then, in step 120, print processing system providers 16 complete print job 12, including storing, processing, and/or printing print job 12, and, in step 122, deliver print job 12 to user 14.

In one illustrative embodiment, print job service provider 36 distributes print request 74 for print job 12 and data file 76 for print job 12 to storage provider 20 for storage, as specified by storage option attribute 802 of print request 74. Thereafter, print job service provider 36 retrieves print request 74 and data file 76 from storage provider 20 and distributes print request 74 and data file 76 to processing provider 24 for processing, as specified by processing option attribute 803 of print request 74. Thereafter, print job service provider 36 distributes print request 74 and data file 76, as processed by processing provider 24, to print provider 28 for printing, as specified by file format, print medium size, print medium type, number of copies, printing quality option, printing layout, color printing, and/or finishing option attributes 804–811, respectively, of print request 74. In addition, print job service provider 36 distributes print request 74 and data file 76 to delivery provider 32. Print provider 28, therefore, distributes printed print job 12 to delivery provider 32 for delivery, as specified by delivery option attribute 812 of print request 74. Thus, delivery provider 32 delivers completed print job 12 to user 14.

By distributing print job 12 to print processing system providers 16, print processing system 10 manages processing of print job 12 for user 14. Since print job processing services 18 of print processing system providers 16 are registered with print processing system registry 38, user 14 need only submit print request 74 for print job 12 and data file 76 for print job 12 to print job service provider 36. Thus, print processing system 10 automatically determines which print processing system providers 16, including storage provider 20, processing provider 24, print provider 28, and/or delivery provider 32, are necessary to fulfill print job 12. In addition, by providing print processing system registry 38, print processing system 10 allows print processing system providers 16 to effectively and efficiently advertise their respective print job processing services 18 to print job service provider 36. Furthermore, by defining communication network 42 linking user 14, print job service provider 36, print processing system registry 38, and print processing system providers 16, print request 74 for print job 12 and data file 76 for print job 12 can be easily and efficiently distributed during processing.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system for processing a print job of a user, the system comprising:

a print processing system registry configured to have discrete print processing services of a plurality of discrete print processing providers registered therewith, the discrete print processing providers including a print job storage provider, a print job processing provider, a print job print provider, and a print job delivery provider, and the discrete print processing services including a storage capability of the print job storage provider to store a data file for the print job, a processing capability of the print job processing provider to process the data file for the print job, a printing capability of the print job print provider to print the print job, and a delivery capability of the print job delivery provider to deliver a completed print job to the user; and a print job service provider configured to communicate with the print processing system registry and coordinate utilization of the discrete print processing services of the discrete print processing providers to fulfill the print job, wherein the print job service provider is adapted to receive a print request and the data file for the print job from the user and distribute the print request and the data file to the print job storage provider, the print job processing provider, the print job print provider, and the print job delivery provider for the user based on the print request and which of the discrete print processing services are necessary for the print job.

2. The system of claim 1, wherein the print processing system registry and the print job service provider are configured to communicate with the print job storage provider, the print job processing provider, the print job print provider, and the print job delivery provider via a communication network, wherein the print processing system registry is adapted to receive the storage capability, the processing capability, the printing capability, and the delivery capability via the communication network, and wherein the print job service provider is adapted to distribute the print request and the data tile to the print job storage provider, the print job processing provider, the print job print provider, and the print job delivery provider via the communication network.

3. The system of claim 1, wherein the print job service provider is adapted to submit the print request and the data file for the print job to the print processing system registry for the user, wherein the print processing system registry is adapted to compare the print request for the print job with the storage capability, the processing capability, the printing capability, and the delivery capability and determine which of the storage capability, the processing capability, the printing capability, and the delivery capability is necessary for the print job, and wherein the print job service provider is adapted to automatically distribute, without interaction by the user, the print request and the data file for the print job to the print job storage provider if the storage capability is necessary for the print job, the print job processing provider if the processing capability is necessary for the print job, the print job print provider if the printing capability is necessary for the print job, and the print job delivery provider if the delivery capability is necessary for the print job.

4. The system of claim 1, wherein the print job service provider is configured to communicate with the user via a communication network, and wherein the print job service provider is adapted to receive the print request and the data file for the print job from the user via the communication network.

5. The system of claim 1, wherein the print job service provider is adapted to distribute the print job to the print job storage provider, and wherein the print job storage provider is adapted to store the print job, the storage capability of the print job storage provider including a storage provider identification and at least one of a storage term and a storage cost.

6. The system of claim 1, wherein the print job service provider is adapted to distribute the print job to the print job processing provider, and wherein the print job processing provider is adapted to process the print job, the processing capability of the print job processing provider including a processing provider identification and at least one of a print job conversion capability, a print job translation capability, a print job enhancement capability, and a processing cost.

7. The system of claim 1, wherein the print job service provider is adapted to distribute the print job to the print job print provider, and wherein the print job print provider is adapted to print the print job, the printing capability of the print job print provider including a print provider identification and at least one of a file format compatibility, a print medium capability, a printing quality capability, a printing layout capability, a color printing capability, a finishing capability, and a printing cost.

8. The system of claim 1, wherein the print job delivery provider is adapted to deliver the completed print job to the user, the delivery capability of the print job delivery provider including a delivery provider identification and at least one of a delivery option and a delivery cost.

9. A system for processing a print job of a user, the system comprising:

a print processing system registry configured to have discrete print processing services of a plurality of discrete print processing providers registered therewith, the discrete print processing providers including a print job storage provider, a print job processing provider, a print job print provider, and a print job delivery provider, and the discrete print processing services including a printing capability of the print job print provider to print the print job, a processing capability of the print job processing provider to process a data file for the print job, a storage capability of the print job storage provider to store the data file for the print job, and a delivery capability of the print job delivery provider to deliver a completed print job to the user; and a print job service provider configured to communicate with the print processing system registry and coordinate utilization of the discrete print processing services of the discrete print processing providers to fulfill the print job, wherein the print job service provider is adapted to receive a print request and the data file for the print job from the user and submit the print request and the data file to the print processing system registry, wherein the print processing system registry is adapted to determine which of the printing capability, the processing capability, the storage capability, and the delivery capability is necessary for the print job, and wherein the print job service provider is adapted to automatically distribute, without interaction by the user, the print request and the data file for the print job to the print job print provider if the printing capability is necessary for the print job, the print job processing provider if the processing capability is necessary for the print job, the print job storage provider if the storage capability is necessary for the print job, and the print job delivery provider if the delivery capability is necessary for the print job.

10. The system of claim 9, wherein the print job service provider is adapted to distribute the print job to the print job print provider, and wherein the print job print provider is adapted to print the print job, the printing capability of the print job print provider including a print provider identification and at least one of a file format compatibility, a print medium capability, a printing quality capability, a printing layout capability, a color printing capability, a finishing capability, and a printing cost.

11. The system of claim 10, wherein the print job service provider is adapted to distribute the print job to the print job processing provider, and wherein the print job processing provider is adapted to process the print job, the processing capability of the print job processing provider including a processing provider identification and at least one of a print job conversion capability, a print job translation capability, a print job enhancement capability, and a processing cost.

12. The system of claim 10, wherein the print job service provider is adapted to distribute the print job to the print job storage provider, and wherein the print job storage provider is adapted to store the print job, the storage capability of the print job storage provider including a storage provider identification and at least one of a storage term and a storage cost.

13. The system of claim 10, wherein the print job delivery provider is adapted to deliver the completed print job to the user, the delivery capability of the print job delivery provider including a delivery provider identification and at least one of a delivery option and a delivery cost.

14. A method of processing a print job of a user, the method comprising:
 providing a print processing system registry having discrete print processing services of a plurality of discrete print processing providers registered therewith, the discrete print processing providers including a print job storage provider, a print job processing provider, a print job print provider, and a print job delivery provider, and the discrete print processing services including a storage capability of the print job storage provider to store a data file for the print job, a processing capability of the print job processing provider to process the data file for the print job, a printing capability of the print job print provider to print the print job, and a delivery capability of the print job delivery provider to deliver a completed print job to the user;
 defining a communication network linking a print job service provider and the print processing providers including the print job storage provider, the print job processing provider, the print job print provider, and the print job delivery provider;
 receiving a print request and the data file for the print job at the print job service provider from the user; and
 with the print job service provider, coordinating utilization of the discrete print processing services of the discrete print processing providers to fulfill the print job, including distributing the print request and the data file to the print job storage provider, the print job processing provider, the print job print provider, and the print job delivery provider for the user via the communication network based on the print request and which of the discrete print processing services are necessary for the print job.

15. The method of claim 14, wherein defining the communication network further includes linking the print processing system registry with the print job storage provider, the print job processing provider, the print job print provider, and the print job delivery provider, and further comprising:
 registering the storage capability of the print job storage provider, the processing capability of the print job processing provider, the printing capability of the print job print provider, and the delivery capability of the print job delivery provider with the print processing system registry via the communication network.

16. The method of claim 15, wherein registering the storage capability of the print job storage provider includes registering a storage provider identification and at least one of a storage term and a storage cost.

17. The method of claim 15, wherein registering the processing capability of the print job processing provider includes registering a processing provider identification and at least one of a print job conversion capability, a print job translation capability, a print job enhancement capability, and a processing cost.

18. The method of claim 15, wherein registering the printing capability of the print job print provider includes registering a print provider identification and at least one of a file format compatibility, a print medium capability, a printing quality capability, a printing layout capability, a color printing capability, a finishing capability, and a printing cost.

19. The method of claim 14, wherein defining the communication network further includes linking the print job service provider with the print processing system registry, and further comprising:
 submitting the print request and the data file for the print job to the print processing system registry for the user via the communication network; and
 comparing the print request for the print job with the storage capability of the print job storage provider, the processing capability of the print job processing provider, the printing capability of the print job print provider, and the delivery capability of the print job delivery provider.

20. The method of claim 14, wherein defining the communication network further includes linking the print job service provider with the user, and wherein receiving the print request and the data file for the print job includes receiving the print request and the data file at the print job service provider from the user via the communication network.

21. The method of claim 14, wherein distributing the print request and the data file includes distributing the print request and the data file to the print job storage provider, and further comprising:
 storing the print request and the data file.

22. The method of claim 14, wherein distributing the print request and the data file includes distributing the print request and the data file to the print job processing provider, and further comprising:
 processing the data file.

23. The method of claim 14, wherein distributing the print request and the data file includes distributing the print request and the data file to the print job print provider, and further comprising:
 printing the print job.

24. The method of claim 15, wherein registering the delivery capability of the print job delivery provider includes registering a delivery provider identification and at least one of a delivery option and a delivery cost.

* * * * *

UNITED STATES PATENT AND TRADEMARK OFFICE
CERTIFICATE OF CORRECTION

PATENT NO. : 7,102,774 B2  Page 1 of 1
APPLICATION NO. : 09/727094
DATED : September 5, 2006
INVENTOR(S) : Craig R. White

It is certified that error appears in the above-identified patent and that said Letters Patent is hereby corrected as shown below:

In column 3, line 51, insert -- 10 -- before "automatically".

In column 13, line 39, in Claim 2, delete "tile" and insert -- file --, therefor.

Signed and Sealed this

Eleventh Day of August, 2009

David J. Kappos
*Director of the United States Patent and Trademark Office*